United States Patent [19]

Dragon

[11] Patent Number: 4,462,385
[45] Date of Patent: Jul. 31, 1984

[54] GAS FURNACE ENERGY SAVER

[76] Inventor: Edward S. Dragon, 6234 S. 38th, Omaha, Nebr. 68107

[21] Appl. No.: 467,321

[22] Filed: Feb. 17, 1983

[51] Int. Cl.³ ............................................. F24H 3/00
[52] U.S. Cl. ...................................... 126/112; 126/117; 165/DIG. 2; 237/55
[58] Field of Search ............. 126/117, 77, 15 R, 15 A, 126/146, 112, 99 R, 99 C; 237/55; 165/DIG. 2

[56] References Cited

U.S. PATENT DOCUMENTS

| | | | |
|---|---|---|---|
| 2,619,022 | 11/1952 | Hergenrother | 237/55 |
| 2,711,683 | 6/1955 | Ryder | 237/55 |
| 2,764,972 | 10/1956 | Ryder | 237/55 |
| 3,094,980 | 6/1963 | Inabnit | 126/121 |
| 3,724,443 | 4/1973 | Carson | 126/121 |
| 4,043,313 | 8/1977 | Sherman | 126/122 |
| 4,141,336 | 2/1979 | Fitch | 126/121 |
| 4,142,507 | 3/1979 | Stanko | 126/121 |
| 4,142,679 | 3/1979 | McKillop | 126/99 C |
| 4,241,874 | 12/1980 | Schossow | 126/117 |
| 4,270,513 | 6/1981 | Mitchelson | 237/55 |
| 4,294,223 | 10/1981 | Montague | 165/DIG. 2 |
| 4,300,527 | 11/1981 | Montague | 165/DIG. 2 |
| 4,349,009 | 9/1982 | Patterson | 165/DIG. 2 |
| 4,416,254 | 11/1983 | Di Pietro | 126/112 |

Primary Examiner—Daniel J. O'Connor
Attorney, Agent, or Firm—Zarley, McKee, Thomte, Voorhees & Sease

[57] ABSTRACT

A gas furnace is described which is of conventional design except for the means by which combustion air is supplied to the burner assembly. The gas furnace includes a cabinet having a burner assembly, heat exchanger and flue provided therein. The flue is in communication with a chimney extending upwardly from the building. An enclosure extends around the chimney and is spaced therefrom to define an air passageway. The upper end of the air passageway is in communication with the atmosphere outside of the building. Duct work connects the lower end of the air passageway with the combustion air opening formed therein so that combustion air for the burner assembly will be drawn from the outside atmosphere downwardly through the air passageway rather than from the interior of the building. As the air passes downwardly through the air passageway, the air is heated by the chimney.

2 Claims, 5 Drawing Figures

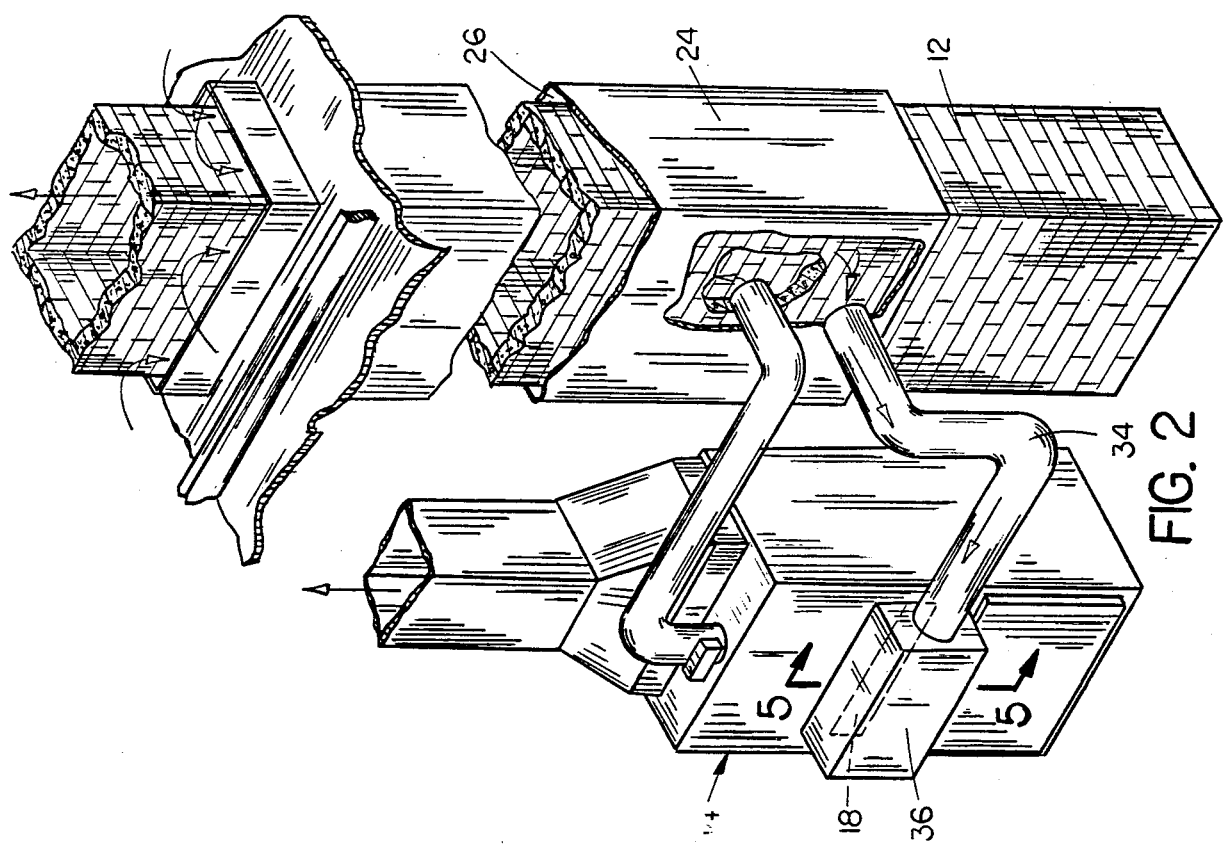
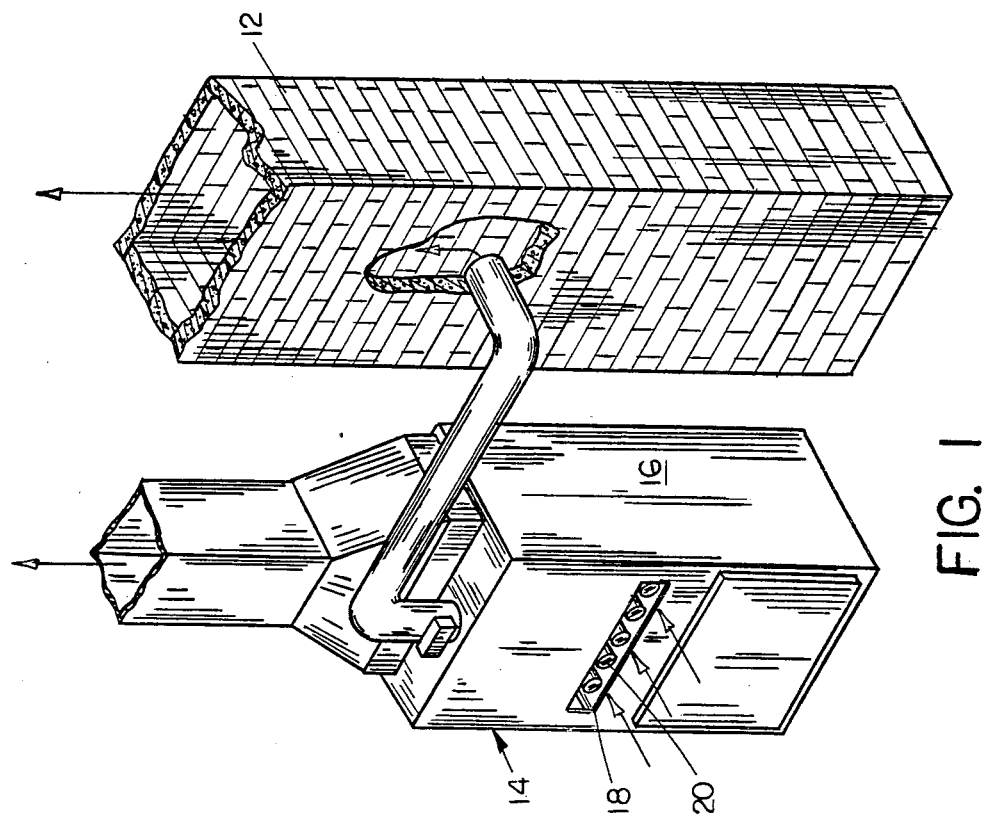
FIG. 2
FIG. 1

GAS FURNACE ENERGY SAVER

BACKGROUND OF THE INVENTION

This invention relates to a gas furnace and more particularly to a gas furnace which results in energy savings.

Conventional gas furnaces normally include a cabinet which has a combustion air opening formed therein which allows air from the interior of the building to be supplied to the burner assembly so that the gas will combust. Obviously, the fact that the air is drawn from the interior of the building results in a considerable oxygen loss within the building. In new houses of "tight" construction, the problem is even more severe.

Therefore, it is a principal object of the invention to provide a gas furnace wherein atmospheric air is supplied to the burner assembly rather than air from the interior of the building.

Still another object of the invention is to provide a gas saver wherein air is drawn from the outside atmosphere and is pre-heated by the chimney prior to being supplied to the burner assembly.

A further object of the invention is to provide a gas furnace which results in considerable energy savings.

Still another object of the invention is to provide a gas furnace which is economical of manufacture and durable in use.

These and other objects will be apparent to those skilled in the art.

BRIEF DESCRIPTION OF THE DRAWINGS

FIG. 1 is a schematic view of a conventional gas furnace installation:

FIG. 2 is a schematic view illustrating the gas furnace of this invention:

SUMMARY OF THE INVENTION

Figure 3:
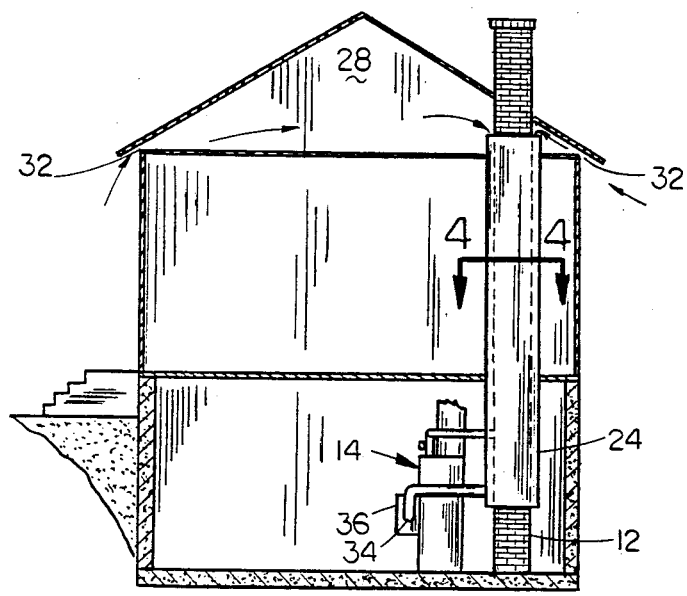
FIG. 3 is a sectional view as seen on lines 3—3 of FIG. 2.
Figure 4:
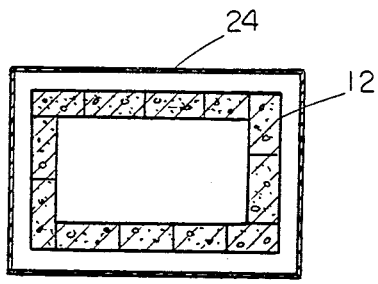
FIG. 4 is a front view of the furnace of this invention.
Figure 5:
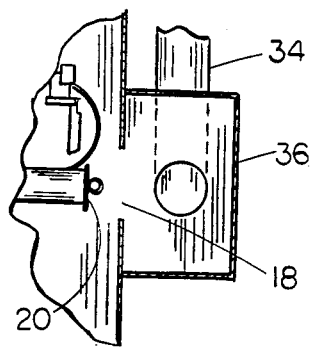
FIG. 5 shows the preignition chamber in detail.

A gas furnace is disclosed which is installed in a building having a chimney extending upwardly therefrom. An enclosure is positioned around a portion of the length of the chimney to define an air passageway therebetween. The upper end of the air passageway is in communication with atmospheric air. The lower end of the air passageway is connected to a duct extending therefrom which is in communication with the combustion air opening in the furnace cabinet so that the combustion air will be drawn downwardly through the air passageway and supplied to the burner assembly of the furnace. As the air passes downwardly through the air passageway, the air is pre-heated by the heat from the chimney.

DESCRIPTION OF THE PREFERRED EMBODIMENT

FIG. 1 illustrates a conventional gas furnace which is located within a building having a chimney 12 extending upwardly therefrom. The numeral 14 refers to a gas furnace 14 having a cabinet 16 with a combustion air opening 18 formed therein through which air is drawn for the gas burner assembly 20. The flue of the furnace is connected to the chimney 12 in conventional fashion. Thus, in operation of the conventional furnace, combustion air is drawn from the interior of the building into the gas burner assembly. The burning of the gas in the furnace uses a tremendous amount of oxygen from within the building and the same is extremely troublesome especially in those buildings of "tight" construction. It should also be pointed out that heat from the furnace burner assembly rises upwardly and out the chimney which in turn creates a vacuum while traveling up the chimney. This vacuum does draw the warm air and oxygen through the combustion air opening and out through the chimney.

It is this type of conventional furnace that is modified so as to achieve the valuable energy savings to be described hereinafter. In FIG. 2, the chimney 12 is seen to be enclosed by an enclosure 24 positioned along a portion of the length thereof to create an air passageway 26. It is preferred that the upper end of the air passageway 26 be open within the attic space of the building which is referred to generally by the reference numeral 28. It is also preferred that the upper end of the air passageway 26 be covered by a screen or the like. The attic space 28 is in communication with the outside atmosphere by means of vents 32.

The lower end of the air passageway 26 has a duct or duct work 34 extending therefrom which is in communication with a pre-ignition chamber 36 which is mounted on the furnace 14 so as to close the combustion air opening 18.

As the gas burner is operating, air will be drawn downwardly through the air passageway 26 into the duct 34 and into the chamber 36 and thence into the gas burner 20. As the air passes downwardly through the air passageway 26, it will be pre-heated by the heat of the chimney. This is extremely important since the supplying of outside atmosphere directly to the chamber 36 without heating would require additional heat being consumed to heat the air to the proper temperature.

The purpose of the chamber 36 is to provide a sufficient volume of air to be present therein so that the burner assembly will properly ignite. In other words, the chamber 36 insures that sufficient air will be initially present to permit the burner assembly to ignite.

Thus it can be seen that a novel energy saving gas furnace has been described wherein combustion air for the gas burner is not drawn from the interior of the building but is drawn from the outside atmosphere thereby preventing oxygen from within the building being consumed by the gas burner. It can also be seen that the atmospheric air is pre-heated by the chimney as it is being supplied to the gas burner thereby resulting in considerable savings. Thus it can be seen that the gas furnace of this invention accomplishes at least all of the stated objectives.

I claim:

1. In combination,
   a gas furnace for a building including a cabinet having a burner assembly, exchanger and flue provided therein,
   said cabinet having a combustion air intake opening formed therein which communicates with the burner assembly to provide combustion air therefor,
   said flue being in communication with a chimney means extending upwardly from the building,
   an enclosure extending around at least a portion of the length of said chimney means and being spaced therefrom to define an air passageway, said enclosure having an inlet opening so that said air passageway is in operative communication with the atmosphere outside of the building, an enclosure means mounted on said cabinet closing said combustion air intake opening and defining a pre-ignition chamber in communication with said burner assembly, connection means connecting said air passageway to said enclosure means and said pre-ignition chamber whereby combustion air for said burner assembly will be passed downwardly, from the outside atmosphere, through said air passageway and said pre-ignition chamber to said burner assembly, said combustion air being heated by said chimney means as it passes downwardly through said air passageway to said burner assembly, said connection means and said air passageway means substantially preventing air in the interior of the building from being supplied to said burner assembly.

2. The combination of claim 1 wherein said pre-ignition chamber of said enclosure means has a predetermined volume to provide sufficient air to allow said burner assembly to ignite.

* * * * *